US012415704B2

(12) United States Patent
Boxum

(10) Patent No.: US 12,415,704 B2
(45) Date of Patent: Sep. 16, 2025

(54) METHOD TO OPERATE A STAIRLIFT

(71) Applicant: TK Home Solutions B.V., Krimpen aan den IJssel (NL)

(72) Inventor: Cornelis Boxum, Delfgauw (NL)

(73) Assignee: TK Home Solutions B.V., Krimpen aan den IJssel (NL)

( * ) Notice: Subject to any disclaimer, the term of this patent is extended or adjusted under 35 U.S.C. 154(b) by 0 days.

(21) Appl. No.: 18/421,412

(22) Filed: Jan. 24, 2024

(65) Prior Publication Data

US 2024/0253945 A1 Aug. 1, 2024

(30) Foreign Application Priority Data

Jan. 30, 2023 (EP) .................................... 23153840

(51) Int. Cl.
*B66B 1/30* (2006.01)
*B66B 9/08* (2006.01)

(52) U.S. Cl.
CPC .................. *B66B 1/30* (2013.01); *B66B 9/08* (2013.01); *B66B 9/0838* (2013.01)

(58) Field of Classification Search
CPC ................................ B66B 9/08; B66B 9/0838
See application file for complete search history.

(56) References Cited

U.S. PATENT DOCUMENTS

| | | | | |
|---|---|---|---|---|
| 10,752,467 | B2 * | 8/2020 | Pugh | B66B 9/08 |
| 2008/0128213 | A1 * | 6/2008 | Harris | B66B 9/0846 187/289 |
| 2021/0163263 | A1 | 6/2021 | Boxum | |

FOREIGN PATENT DOCUMENTS

| | | | | |
|---|---|---|---|---|
| EP | 0564177 A1 | | 10/1993 | |
| EP | 3178770 A1 | | 6/2017 | |
| EP | 3915924 A1 | | 12/2021 | |
| GB | 2526621 A | * | 12/2015 | B66B 9/08 |
| GB | 2527410 A | * | 12/2015 | B66B 9/0815 |
| WO | WO-2009098480 A1 | * | 8/2009 | B66B 9/08 |
| WO | WO-2019238736 A1 | * | 12/2019 | B66B 1/30 |

* cited by examiner

*Primary Examiner* — Diem M Tran
(74) *Attorney, Agent, or Firm* — Dinsmore & Shohl LLP

(57) ABSTRACT

Embodiments described herein are directed to a method to operate a stairlift, wherein the stairlift includes a guide extending along the staircase, a carriage moveable along the guide and configured to carry a person, and user interaction device for operating the stairlift. At least a first speed profile defining a movement of the carriage at positions along the guide is set. The first speed profile is associated to a first input of the user interaction device and adapted values of the first speed profile or a second speed profile defining a movement of the carriage at positions along the guide different than the first speed profile is associated to a second input of the user interaction device.

13 Claims, 1 Drawing Sheet

METHOD TO OPERATE A STAIRLIFT

CROSS REFERENCE TO RELATED APPLICATIONS

This application is a continuation-in-part of and claims priority from European Patent Application No. 23 153 840.6, filed on Jan. 30, 2023, the disclosure of which is herein incorporated by reference in its entirety.

TECHNICAL FIELD

The present disclosure generally relates to a method to operate a stairlift for transporting a person along a staircase, wherein the staircase includes a guide extending along the staircase, a carriage being moveable along the guide and configured to carry a person, and a user interaction device for operating the stairlift. The present disclosure further relates to such a stairlift.

BACKGROUND

Stairlifts are known from the state of the art. With such, persons unable to use a staircase, e.g. due to disability or certain conditions, are transported along the staircase between a lower and an upper landing position and/or intermediate landing positions, while the staircase is still fully usable for other persons in its usual sense. Such stairlifts have a guide such as a rail or the like, on which the carriage is moved, e.g. by a drive unit connected to the guide, wherein the drive unit may include further components of the stairlift. A carriage for a stairlift usually is a chair, which allows for rest of arms and feet, may be foldable to allow other use of the staircase and takes a certain boarding position at the landing positions. Stairlifts are mostly retrofitted with already existing staircases.

With such stairlifts, a need exists to get from one landing position to another in a fast manner but at the same time save and at good comfort. However, comfort and safety may be reduced above a certain speed, in particular when the guide turn around a vertical or horizontal axle and/or when the carriage is rotated around the vertical axle, e.g. to avoid confrontation with steps of the staircase or to avoid contact with a wall of a stairwell as described in WO 2005/087644. In such situations, movements/rotation of the carriage in different directions overlay with each other.

While the comfort is mostly an individual aspect and tolerable speed may therefore differ from user to user, safety aspects may be specified in regulations (e.g. directives or standards) and therefore set a limit to traveling speed of the carriage.

In the state of the art, rail-data is determined defining speed values and/or rotational angle values at certain positions of the guide. Advantageously, such rail-data considers features of a particular stairlift like guide trajectory, necessary rotation angles and also users' needs. Disadvantageously, the user is bound to the rail-data in his/her use of the stairlift.

From EP 3 178 770 A1, a stairlift is known having a sensor for detecting, whether or not a passenger is present on the stairlift, wherein a remote control device is adapted to set a first traveling speed profile in case it is determined that no passenger is present and to set a second lower traveling speed profile in case it is determined that a passenger is present.

SUMMARY

Based on the state of art described above, it is an object of the present disclosure to provide a stairlift, which is more convenient to control.

This object is solved by the features of the independent claims. Advantageous embodiments are indicated in the dependent claims. Where technically possible, the features of the dependent claims may be combined as desired with the features of the independent claims and/or other dependent claims.

In particular, the object is solved by a method to operate a stairlift for transporting a person along a staircase, wherein the stairlift includes a guide extending along the staircase, a carriage being moveable along the guide and configured to carry a person, and a user interaction device for operating the stairlift, wherein at least a first speed profile defining a movement of the carriage at positions along the guide means is set, and wherein the first speed profile is associated to a first input of the user interaction device and adapted values of the first speed profile or a second speed profile defining a movement of the carriage at positions along the guide different than the first speed profile is associated to a second input of the user interaction device.

Insofar as elements are designated with the aid of numbering, for example "first element", "second element" and "third element", this numbering is provided purely for differentiation in the designation and does not represent any dependence of the elements on one another or any mandatory sequence of the elements. In particular, this means that, for example, a device or method need not have a "first element" in order to have a "second element". Also, the device or method may have a "first element", as well as a "third element", but without necessarily having a "second element". There may also be multiple units of an element of a single numbering, for example multiple "first elements".

The guide may for example be rails, tracks or the like and may be integrated or retrofitted to the staircase, e.g. at steps of the staircase, e.g. standing on the tread of a number of steps, at a balustrade of the staircase or a wall next to the staircase. They include at least one such rail or track or at least two rails or tracks running next to and/or above each other. The guide may run parallel to the slope of the staircase and extend horizontally or vertically into landing positions at the lower end, the upper end, or an intermediate position of the staircase.

A carriage may include a drive unit which is connected to and guided by the guide and on which a chair or platform of the carriage is mounted in a pivotable manner to allow leveling in an upright position when the orientation of the guide vary. The carriage may further include a chair, wherein the chair may include arm rests, a foot rest, a seat, and a seat belt to provide for safe accommodation of the transported person. In a landing position, the chair may turn away from the stairs to allow for pleasant and safe boarding from a floor level. Such turn may be implemented by a trajectory of the guide or may be implemented by rotation the carriage around a vertical axle against the guide, e.g. a rotation of the chair against the drive unit. A carriage may further/alternatively to the chair include a platform to carry a wheelchair, wherein the platform may include balustrades, at least one door in the balustrades and a retention device such as belts, hooks, bars, and the like. In the landing position the platform is leveled with a floor. A second drive for moving the carriage along the rail, e.g. an electric motor, in particular a brushed or brushless DC motor, a stepper motor or a servo motor, may be housed in a drive unit or may be of separate configuration from the carriage while being connected to the carriage with traction or integrated in the guide.

User interaction device may include a joystick, a rotatable knob, a touchpad, a touchscreen, one or more button/s, a remote control or the like and may further be coupled, attached, positioned or located at the carriage, e.g. at an arm rest or at a balustrade of a platform, via a fastener such as bolt and nut, rivet, screw, hook and loop, weld, adhesive, epoxy, and/or the like, and/or may be located in at least one landing position, e.g. at a wall or at a balustrade of the staircase, such as a remote control via the fastener. The user interaction device may have an active state and inactive state, which may be associated to certain positions of the interaction device.

The carriage is rotatable around the vertical axle relative to the guide by a first drive. E.g. the carriage includes a drive unit connected to the guide, wherein the orientation of the drive unit against the guide is fixed and wherein the chair or the platform is rotatable against the drive unit. The first drive may then be housed in the drive unit. The present disclosure also refers to systems, wherein the entire carriage is rotatable against the guide in any form. The first drive may be an electric motor, such as a brushed or brushless DC motor, a servo motor or a stepper motor.

A speed profile defines the movement of the carriage along the trajectory of the guide, wherein the movement refers to the speed/position in any (rotational) direction, such as translational speed along the guide (e.g. by the second drive), rotational speed or rotational position around a vertical axle (e.g. by the first drive) and/or rotational speed or rotational position around a horizontal axle (e.g. by a leveling mechanism). Accordingly, the time and/or position, where a specific movement of the carriage is started or stopped and a gradient of acceleration or deceleration are defined in the speed profile, for the movement of the carriage along the guide and for the rotational movement by the first drive. The speed profile may therefore consist of speed values, position values such as rotational angle values and or acceleration value (general: movement values), of which each may vary for different positions of the carriage along the guide. As an example, the speed profile defines that a rotation of the carriage is started a specific distance before a turn is coming up in the trajectory of the guide or before a specific position of the staircase is reached, and further defines, which torque is applied, which angle the rotation has to reach, which rotational speed may be applied at the most and/or at which speed the carriage moves along the guide during rotation around the vertical axle.

Within the description and the claims, the terms "person" and "user" are used interchangeable and describe a person interacting with the stairlift in some way. The specific terms are used as best fit in a particular context, wherein "person" mostly refers to the transportation as such and the "user" mostly refers to a/the person interacting with the stairlift during operation.

According to the technical teaching of the present disclosure, at least a first speed profiles is set, wherein a user can choose by different inputs of the user interaction device between the first speed profiles or adapted values of the first speed profile or a second speed profile according to his actual needs at the time he uses the stairlift. Adapted values of the speed profile may be a certain percentage of a speed defined in the first speed profile, thus the values of the speed profile may be reduced or increased by a certain percentage. Thus, when the user inputs the first input, the carriage is operated according to the first speed profile and when the user inputs the second input, the carriage is operated according to adapted values of the first speed profile or according to the second speed profile. For example the user may choose the first speed profile, wherein the first speed profile is optimized for short travel time with the stairlift, when he/she is in a hurry while he/she may choose adapted values or the second speed profile, wherein the second speed profile is optimized for high comfort, when he/she feels unwell. Advantageously, by providing the first speed profile and an option to deviate from the first speed profile, a general advantage of a speed profile that it considers all features of the stairlift and coordinates the movements of the stairlift according to the individual preferences of the user is reached but at the same time the present disclosure provides an option to deviate from one particular speed profile when the user has different needs at the time he/she uses the stairlift.

In one embodiment, the first speed profile is optimized for shortest travel time of the stairlift and/or the second speed profile is optimized for high comfort of a person carried on the carriage. As travel time and comfort are the most sensibly recognized features of a stairlift in the users experience, the users' needs associated with these features can thus be addressed to provide a good user experience at any time of use.

The first speed profile and a distinct reduction of the values of the first speed profile (e.g. 80%, 50% or the like) or the second speed profile may be chosen by discrete inputs of the user interaction device, which are bound to the respective speed profile/values. E.g. a binary button may be provided for each of the speed profiles or a distinct reduction, e.g. a button for 100% of the first speed profile (first input), and a button for 80% of the first speed profile. Alternatively, the user interaction device may provide intermediate inputs, e.g. having more than one or two positions or being steplessly variable. Intermediate speed profiles having movement values between movement values of the first speed profile and movement values of the second speed profile may then be associated to intermediate inputs of the user interaction devices. This is, the intermediate speed profiles may be individual speed profiles different from the first speed profile and different from the second speed profile or may be derived from the movement values of the first speed profile and the movement values of the second speed profile relative to the intermediate input. For example, a third input like a button or defined position of a joystick or knob is defined at the user interaction device, which is associated to an intermediate speed profile. Alternatively, with user interaction device being steplessly variable, the first speed profile is associated to a first position of the user interaction device and the second speed profile is associated to a second position of the user interaction device, wherein between the two positions, the user interaction device cover a certain distance. At 20% of the distance, a movement value at a certain position of the guide may be the movement value of the first speed profile plus 20% of the difference between the movement value of the first speed profile and the movement value of the second speed profile and so on.

In an embodiment, the user interaction device is formed by a joystick, a rotatable knob, a potentiometer, a number of buttons and/or a touchscreen. All these user interaction devices allow for comfortable input, in particular with or without intermediate input. Further, all these user interaction device allow to choose a direction of the carriage to move along the guide, upwards or downwards. For the different directions of the stairlift, the same first and/or second speed profiles may be associated to the first and second input or at least one different speed profiles may be associated to an according input. Different speed profiles are set for different directions of the carriage along the guide, wherein for both directions two or more speed profiles may be set according to the present disclosure.

In an embodiment, the carriage is rotatable around a vertical axle, wherein the speed profiles include at least one movement value for a translational speed of the carriage along the guide and at least one movement value for a rotational speed around the vertical axle and/or an rotational angle, and wherein the movement values are respectively associated to positions of the carriage along the guide. The advantage of the described method may be reached in this embodiment, as the combination of the translational movement of the carriage along the guide and the rotational movement of the carriage around the vertical axle require good coordination with each other to avoid delays or uncomfortable overlay of the movements and as the translational and rotational movements may trigger each other.

In this embodiment, the stair lift may further include a leveling mechanism for keeping the carriage in a horizontal orientation, wherein the leveling mechanism is operated in a stand-alone manner, e.g. as a closed control circuit. In an alternative, the speed profiles include at least one movement value for a rotational speed of the leveling mechanism and/or for a rotational angle for the leveling mechanism, wherein the at least one movement value is associated to a position of the carriage along the guide. Thus, the speed profile included movement values for the translational movement and for two different rotational movements and the advantage of providing coordination between different movements of the carriage with speed profiles is particularly given.

At least one rotational angle value is determined by rotating the carriage manually for at least one position of the carriage along the guide during a test run of the carriage along the guide. Thus, the stairlift is configured to allow manual rotation of the carriage around the vertical axle and/or manual rotation of the leveling mechanism at least during the test run, e.g. by decoupling the first drive or a third drive of the leveling mechanism from the carriage, while the rotational angles of the carriage is still monitored or registered in some way. The carriage may then be moved along the guide by hand or by the second drive at a slow speed and may be positioned in the necessary angles at certain positions. While being positioned in a certain position and/or rotational angle, the stairlift may register the position/rotational angle and set/determine movement values for the speed profile accordingly.

In an embodiment, the at least one first speed profile and/or the at least one second speed profile are determined according to individual preferences of a user. This is, the speed profiles may be set up during installation of the stairlift at the site with a specific user present, wherein e.g. the specific user advises a technician on which movement values he/she regards as slow, comfortable, uncomfortable and/or tolerable and the technician determines and programs the speed profiles accordingly.

The object is further solved by a stairlift for transporting a person along a staircase, including a guide extending along the staircase, a carriage being moveable along the guide and configured to carry a person, a user interaction device for operating the stairlift, and at least one control unit, wherein the control unit is configured to execute a predescribed method.

The at least one control unit may be an electronic control unit, a central processing unit (CPU), and the like, for performing the functions as described herein. As such, the at least one control unit may be configured to receive, analyze and process sensor data, perform calculations and mathematical functions, convert data, generate data, control system components (e.g., the first drive, the second drive, the third drive, the carriage, and the like), and the like. The at least one control unit may include one or more processors, and other components, for example one or more memory modules that stores logic that is executable by the one or more processors and a database based on, for example, user inputs provided via the user interaction device. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, and the like, that may be compiled or assembled into computer-executable instructions and storage on the one or more memory modules. Alternatively, the computer-executable instructions may be written in hardware description language, such as logic implemented via either a field programmable gate array (FPGA) configuration or an application specific integrated circuit (ASIC), all their equivalents. Accordingly, the systems, methods, processes, and/or computer product programs described herein may be implemented in any conventional computer programming language, as preprogrammed hardware elements, or as a combination of hardware and software components. Further, provided herein is a computer program product for use with or by the control unit for controlling components of the stairlift (e.g., the first drive, the second drive, the third drive, the carriage, and the like). The computer program product may include a computer usable medium having computer readable readable instruction or program code embodied on the computer usable medium.

The terms used within the definition of the stairlift are to be understood in the same manner they are described before regarding the method. With the stairlift, the same advantages are provided that are provided with the method. In particular, the stairlift has the advantage of using speed profiles, namely that the movements of the carriage is coordinated and respects all features of the stairlift and the users' needs, while at the same time the user is not bound to one particular speed profile but can choose between different speed profiles according to his/her particular needs at the time of use. The stairlift includes a control unit, which the predescribed method is implemented with.

The carriage is rotatable around a vertical axle by a first drive. The first drive may be a brushed or brushless DC motor, a servo motor or a stepper motor, which is capable of tracking its rotational position and reporting it to a control system.

In an embodiment of the stairlift, it further includes a leveling mechanism for keeping the carriage in a horizontal orientation along the guide. The leveling mechanism may be configured to keep the carriage leveled in a stand-alone manner, e.g. as a closed control circuit, or the angle of the leveling mechanism may be determined by the speed profiles, wherein for example the position, rotational speed or rotational acceleration of a third drive driving the leveling mechanism is determined by the speed profile.

BRIEF DESCRIPTION OF THE DRAWINGS

In the following, the present disclosure is explained in more detail with reference to the accompanying figures using examples of embodiments. The formulation figure is abbreviated in the drawings as FIG.

DETAILED DESCRIPTION

The described embodiments are merely examples that can be modified and/or supplemented in a variety of ways within the scope of the claims. Any feature described for a particular embodiment example may be used independently or in combination with other features in any other embodiment example. Any feature described for an embodiment example of a particular claim category may also be used in a corresponding manner in an embodiment example of another claim category.

Figure 1:
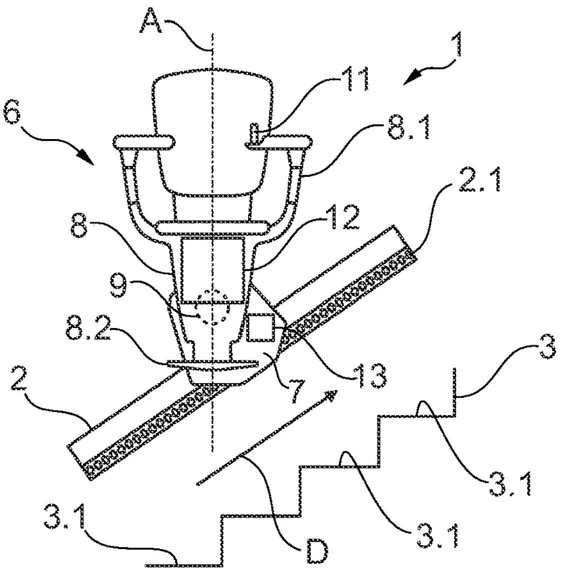
FIG. 1 schematically depicts a view of a stairlift according to an aspect of the present disclosure.

FIG. 1 shows a stairlift 1, to which the embodiments described herein can be applied. The stairlift 1 includes a guide 2 formed as a rail and running parallel to the slope of a staircase 3 in a direction D, wherein the staircase 3 has a number of steps 3.1. The stairlift 1 further includes a carriage 6, which can move along the guide 2 in or against the direction D, and which includes a drive unit 7 and a chair 8, wherein the chair 8 is connected to the drive unit 7 in a pivotable manner by a leveling mechanism 9. For driving the carriage 6, positive engagement devices 2.1 are provided on the guide 2, which cooperate with a second drive (not shown) for driving the carriage 6 along the guide 2 in a translational movement, such as a driven pinion, of the drive unit 7.

The chair 8 includes arm rests 8.1 and a foot rest 8.2 and a user interaction device 11 in the form of a joystick. By pulling the user interaction device 11 to a corresponding side, the carriage 6 may be driven to the according side in the direction D. The user interaction devices 11 are pictured in an upright position which is associated to a use position, while they might be folded, e.g. into a recess at the arm rest 8.1.

The carriage 6 further includes a first drive 12 which is shown schematically and with which the carriage 6, in particular the chair 8 is rotatable around a vertical axle A. The first drive 12 may be a brushed or brushless DC motor, a servo motor or a stepper motor. With a rotational angle phi set by the first drive 12, the carriage 6 can be positioned to avoid collision with steps 3.1, or walls, to (pre)position for translational movement of the carriage 6 through a turn of the guide 2 at highest possible translational speed or to provide a comfortable and desirable boarding position in a landing position of the carriage 6. Accordingly, the guide 2 can have a curved shape, which deviates from a straight line. The direction of travel D and/or the inclination of the guide 2 may change at least once during the course of the guide 2 and the guide 2 may run out horizontally at a landing position, wherein the chair 8 is hold in an upright position due to the leveling mechanism 9. Thus, the guide 2 follow a certain trajectory having turns around horizontal and/or vertical axles or both axles at the same time.

The carriage 6, such as the drive unit 7, may include a control unit 13, which is connected to the first drive 12, the second drive and a third drive (not shown) of the leveling mechanism 9, and with which a torque applied by any of the drives to the carriage 6 can be determined.

As discussed above, the at least one control unit 13 may be an electronic control unit, a central processing unit (CPU), and the like, for performing the functions as described herein. As such, the at least one control unit 13 may be configured to receive, analyze and process sensor data, perform calculations and mathematical functions, convert data, generate data, control system components (e.g., the first drive, the second drive, the third drive, the carriage, and the like), and the like. The control unit 13 may include one or more processors, and other components, for example one or more memory modules that stores logic that is executable by the one or more processors and a database based on, for example, user inputs provided via the user interaction device. Each of the one or more processors may be a controller, an integrated circuit, a microchip, central processing unit or any other computing device.

Figure 2:
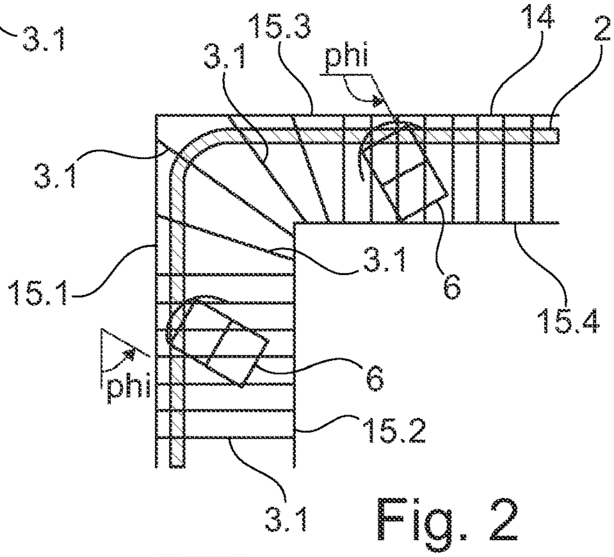
FIG. 2 schematically depicts a top plan view of a stairwell according to one or more embodiments shown and described herein.

FIG. 2 shows a top plan view of a stairwell 14, with a stairlift 1 therein. The stairwell 14 has walls 15.1, 15.2, 15.3, 15.4, and steps 3.1. Carriage 6 is drawn at two positions along guide 2, where it makes an angle phi relative to guide 2. The staircase 3 makes a turn of 90 degrees. In the turn, steps 3.1 narrow in the direction of the center of the turn. When carriage 6 is moved along the guide 2, the carriage 6 needs to be prevented from hitting the walls 15.1, 15.2, 15.3, 15.4 of the stairwell 14 or the steps 3.1. Whether there is a risk of this happening depends on inter alia the width of the stairwell 14 and the height of guide 2 above the steps 3.1. Even when guide 2 are mounted so high above the steps 3.1 that there is no risk of collision with steps 3.1 on the straight parts of the staircase, there may, for instance, be a local risk of collision in the turn due to the narrowing of steps 3.1. The risk of collisions with steps 3.1 in the turn is avoided by rotating the carriage 6 locally in the turn relative to the guide 2 around the vertical axle A in order to avoid collision with steps 3.1. The speed values and angle values describing the movement of the carriage 6 are defined in a speed profile, which defines at least the translational speed/acceleration of the carriage 6 along the guide 2 and the rotational speed/acceleration of the carriage 6 around the vertical axle A.

Figure 3:
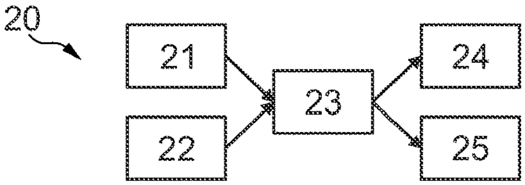
FIG. 3 schematically depicts an illustrative flowchart for a method according to an aspect of the present disclosure.

Now referring to FIG. 3, a method 20 to operate the stairlift 1 includes in a first step 21 setting a first speed profile defining a movement of the carriage 6 at positions along the guide 2. In a second step 22 the method includes setting a second speed profile defining a movement of the carriage 6 at positions along the guide 2 different than the first speed profile. In a third step 23, the speed profiles are associated to different inputs of the user interaction devices 11, namely the first speed profile is associated to a first input of the user interaction devices 11 and the second speed profile is associated to a second input of the user interaction devices 11. With the user interaction device 11 being a joystick as in FIG. 1, the first input may be a full possible displacement of the joystick in the direction of desired travel and the second input may be half of the possible displacement. Alternatively, the first input may be a first button (not shown) and the second input may be a second button (not shown). In a fourth step 24, when the user inputs the first input, the carriage 6 is operated according to the first speed profile. In a fifth step 25, when the user inputs the second input, the carriage 6 is operated according to the second speed profile.

Figure 4:
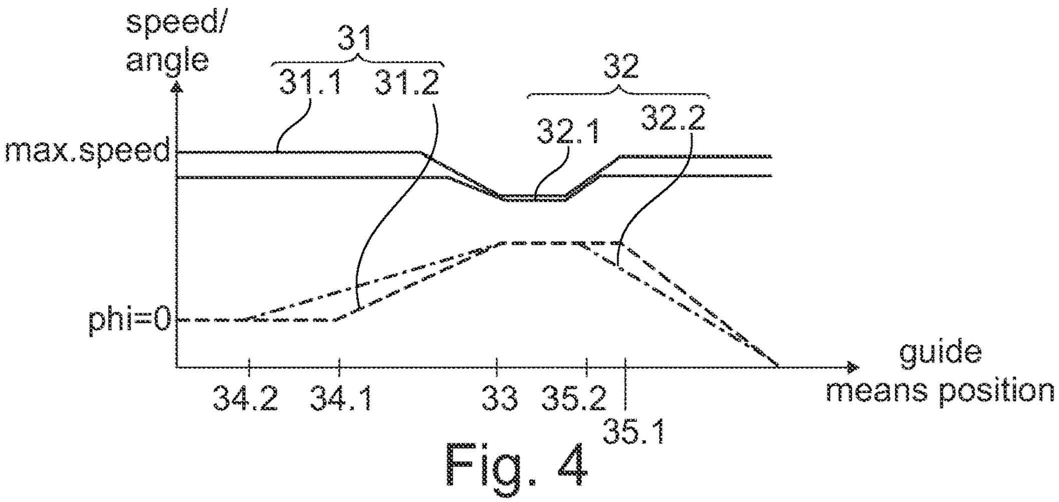
FIG. 4 schematically depicts an illustrative diagram of exemplary speed profiles according to one or more embodiments shown and described herein.

FIG. 4 shows a diagram of two speed profiles 31, 32 with the position of the carriage 6 along the guide 2 on the x-axis and the translational speed of the carriage 6 along the guide 2 and the rotational angle phi on the y-axis. The first speed profile 31 includes translational speed values 31.1 of the carriage 6 along the guide 2 and values 31.2 for the rotational angle phi. The second speed profile 32 includes translational speed values 32.1 of the carriage 6 along the guide 2 and values 32.2 for the rotational angle phi. At a position 33 of the guide 2, a specific angle phi has to be reached, e.g. for a turn of the guide 2 beginning at this position. Therefore the carriage 6 starts to rotate at positions 34.1, 34.2 at a certain torque of the first drive 12. The angle phi is then kept constant after the position 33, e.g. as long as the carriage 6 is in the turn. Afterwards, a counter wise rotation of the carriage 6 is conducted, e.g. to rotate the carriage 6 to an angle phi required at a landing position. This counter wise rotation is started at position 35.1 for the first speed profile 31 and at earlier position 35.2 for the second speed profile 32. The speed value 31.1 for the first speed profile 31 is kept at a maximum most of the time, while being reduced during the turn, e.g. to allow the angle phi at position 33 to be reached and/or to increase comfort in the turn.

The speed values 32.1 for the second speed profile 32 is reduced over the speed values 31.1 of the first speed profile 31. Thus, the first speed profile 31 includes faster speed for the translational movement and also, as rotation of the carriage 6 starts later, for the rotational movement and will therefore result in a relative short travel time, while the second speed profile 32 will result in a longer travel time, while providing better comfort.

The invention claimed is:

1. A method to operate a stairlift for transporting a person along a staircase, wherein the stairlift comprises a guide extending along the staircase;

a carriage being moveable along the guide and configured to carry a person; and a user interaction device located at the carriage for operating the stairlift;

at least a first speed profile defining a movement of the carriage at positions along the guide is set;

wherein the first speed profile is associated to a first input of the user interaction device in response to a first selection by the person positioned on the carriage and a second speed profile defining a movement of the carriage at positions along the guide different than the first speed profile is associated to a second input of the user interaction device in response to a second selection by the person positioned on the carriage.

2. The method according to claim 1, wherein the first speed profile is optimized for shortest travel time of the stairlift or the second speed profile is optimized for high comfort of a person carried in the carriage.

3. The method according to claim 1, wherein intermediate speed profiles having movement values between movement values of the first speed profile and movement values of the second speed profile are associated to intermediate inputs of the user interaction means.

4. The method according to claim 1, wherein the user interaction device is at least one of a joystick, a rotatable knob, a potentiometer, a plurality of buttons and a touch-screen.

5. The method according to claim 4, wherein the user interaction device is steplessly variable.

6. The method according to claim 1, wherein:

the carriage is rotatable around a vertical axle, the speed profiles include at least one movement value for a translational speed of the carriage along the guide and at least one movement value for a rotational speed around the vertical axle or a rotational angle, and the movement values are respectively associated to positions of the carriage along the guide.

7. The method according to claim 6, wherein the stairlift comprises:

a leveling mechanism for keeping the carriage in a horizontal orientation, wherein the speed profiles include at least one movement value for a rotational speed of the leveling mechanism or for a rotational angle for the leveling mechanism, and the at least one movement value is associated to a position of the carriage along the guide.

8. The method according to claim 6, wherein at least one rotational angle value is determined by rotating the carriage manually for at least one position of the carriage along the guide during a test run of the carriage along the guide.

9. The method according to claim 1, wherein the at least one first speed profile or the at least one second speed profile are determined according to individual preferences of a user.

10. The method according to claim 1, wherein different speed profiles are set for different directions of the carriage along the guide.

11. A stairlift for transporting a person along a staircase, comprising a guide extending along the staircase;

a carriage moveable along the guide and configured to carry a person;

a user interaction device located at the carriage for operating the stairlift; and at least one control unit;

wherein the control unit is configured to execute the method according to claim 1.

12. The stairlift according to claim 11, wherein the carriage is rotatable around a vertical axle by a first drive.

13. The stairlift according to claim 12, comprising:

a leveling mechanism for keeping the carriage in a horizontal orientation along the guide.

* * * * *